United States Patent
Alphin et al.

[15] 3,695,014
[45] Oct. 3, 1972

[54] TOBACCO HARVESTERS

[72] Inventors: John G. Alphin; John B. Pitner, both of Florence, S.C.

[73] Assignee: Clemson University, Clemson, S.C.

[22] Filed: Feb. 17, 1970

[21] Appl. No.: 12,024

[52] U.S. Cl. ................................................56/27.5
[51] Int. Cl. .............................................A01d 45/16
[58] Field of Search ......56/27.5; 214/5.5; 131/4, 149

[56] References Cited

UNITED STATES PATENTS

| | | | |
|---|---|---|---|
| 3,179,263 | 4/1965 | Walter | 214/5.5 |
| 3,178,873 | 4/1965 | Meyer | 56/27.5 |
| 3,470,882 | 10/1969 | Clark | 214/5.5 X |
| 3,542,038 | 11/1970 | Hooper | 131/149 |
| 2,702,134 | 2/1955 | Alphin, Jr. | 56/27.5 |
| 3,507,103 | 4/1970 | Pickett et al. | 56/27.5 |

*Primary Examiner*—Louis G. Mancene
*Assistant Examiner*—J. N. Eskovitz
*Attorney*—Allison C. Collard

[57] ABSTRACT

A tobacco harvester comprising a mobile unit with an endless defoliator belt mounted on roller assemblies. There are front and rear upper assemblies and a lower intermediate assembly to provide a lower V-shaped path including a front stripping course, a rear conveyor course and a generally horizontal return course. The belt is provided with openings spaced apart a sufficient distance so that as the belt is travelling diagonally downwardly over its front stripping course each of the stalks will enter one of the openings and the sides of each opening will push the leaves of the stalk downwardly and remove them.

18 Claims, 17 Drawing Figures

PATENTED OCT 3 1972

INVENTORS.
JOHN G. ALPHIN
JOHN B. PITNER
BY
JOHN P. CHANDLER
THEIR ATTORNEY.

INVENTORS.
JOHN G. ALPHIN
BY JOHN B. PITNER

JOHN P. CHANDLER
THEIR ATTORNEY.

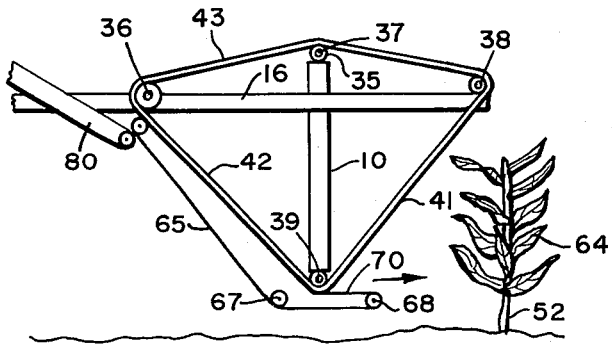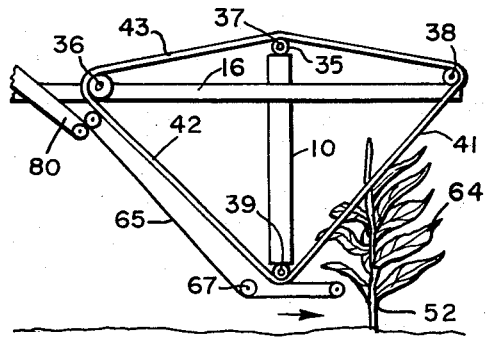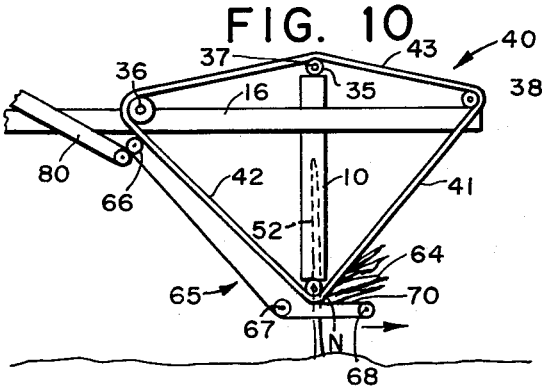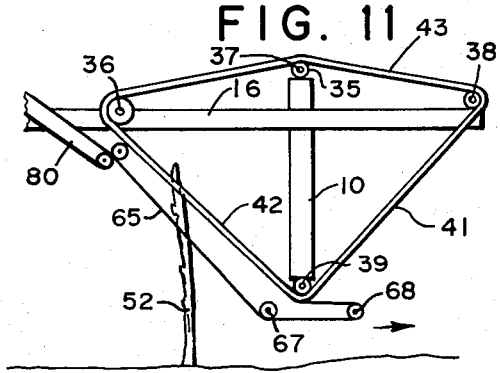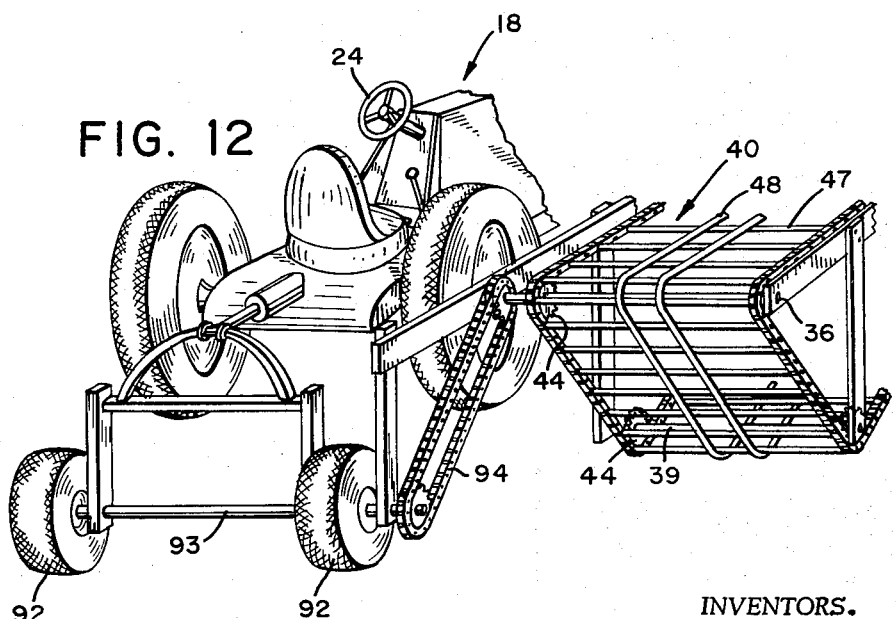

PATENTED OCT 3 1972 3,695,014
SHEET 5 OF 5
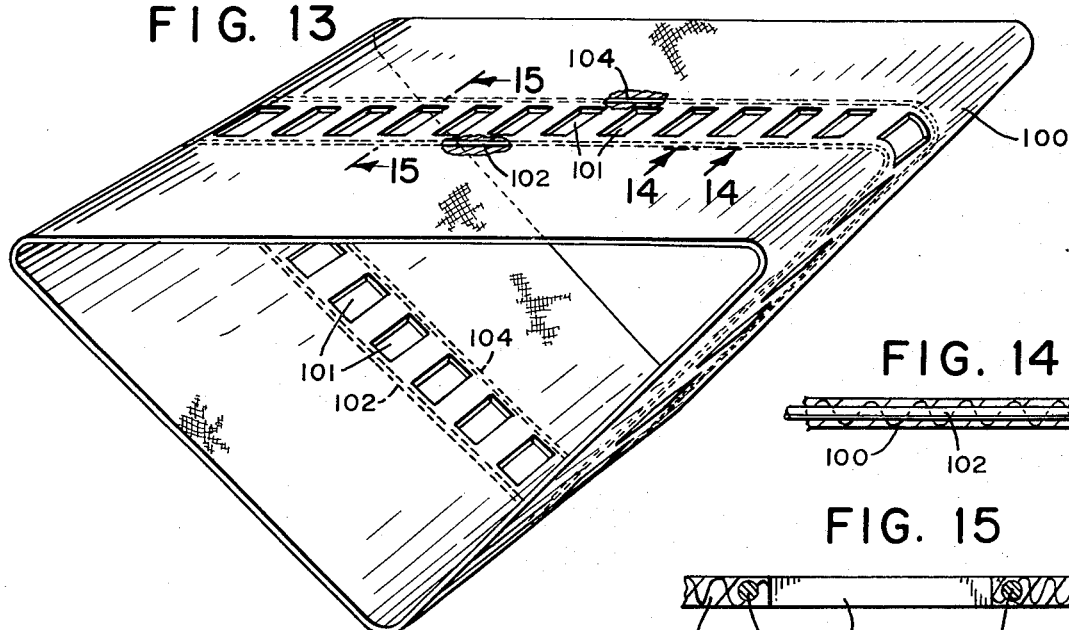
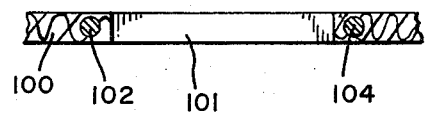
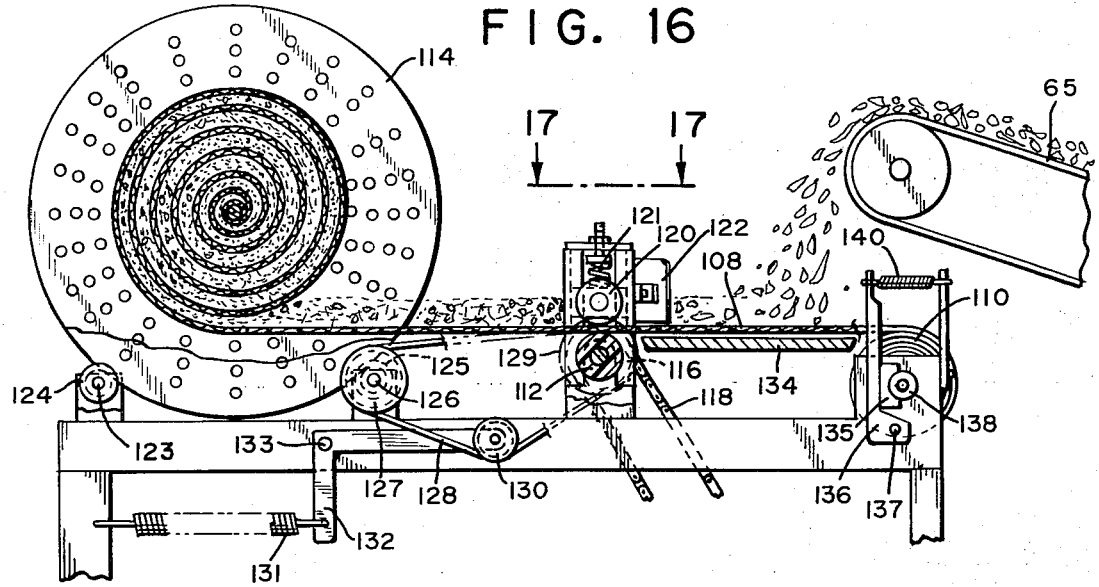
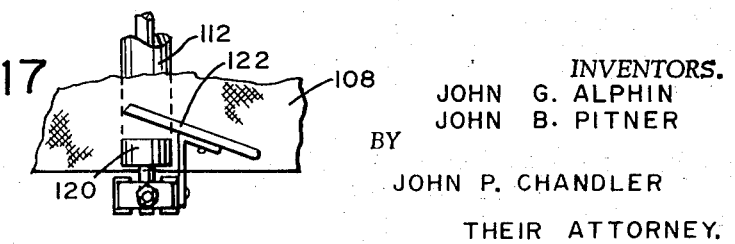
INVENTORS.
JOHN G. ALPHIN
JOHN B. PITNER
BY
JOHN P. CHANDLER
THEIR ATTORNEY.

TOBACCO HARVESTERS

This invention relates to tobacco harvesters and more specifically to a machine having improved defoliating and conveying means.

The harvesting of flue-cured tobacco, or bright-leaf tobacco, is accomplished by workers proceeding through the fields removing tobacco leaves from the plant. This usually involves removing two to four of the leaves at weekly intervals for a period of five to six weeks. This is back-breaking work, made more difficult because it is usually performed under the broiling sun and requires about sixty man-hours per acre. In view of severe labor shortages, numerous means for mechanically removing the leaves have been advanced but none of these have proven practical due to their high cost and tendency to frequent breakdowns. An inherent disadvantage of these machines is that they all require at least two or more distinct defoliating structures working separately or in association with each other to give generally dynamic defoliating means to remove the desired leaves at one pass of the machine relative to the stalk. The operation of these machines is further restricted by the complex transporting systems that convey the harvested leaves to storage units without damaging the leaves remaining on the stalk. Another disadvantage of these machines is that they are limited to the harvesting of rows of tobacco plants and it is possible that new developments in tobacco production may result in a shift from the row cultural practice. Since most farm tobacco allotments are less than ten acres, the adoption of these machines is complicated further because it is estimated that from fifteen to thirty acres of tobacco are required to justify economical use.

An object of the present invention is to overcome all the problems described above and in particular to fill the acute need of most tobacco farmers by providing a simple, low-cost machine operated by one man that has an estimated annual capacity of over 70 acres but probably can be economically used by farmers producing only 5 acres of tobacco. To secure the optimum advantage of the present machine, the plant is modified by being topped at such a height so that all leaves can be harvested at one time. This results in a plant of about one-half the height of the normally topped plant with leaves that are somewhat larger. Research has shown that by making certain minor changes in cultural practices, a field of these lower topped plants has about the same production per acre as normally topped plants.

The simple defoliator of the present invention has an endless belt supported for movement over a triangular course on the machine. The belt, including a front, diagonal stripping course, has openings, capable of receiving a stalk and this opening forms in effect a confining frame whose ends are interconnected. This frame encloses the stalk and passes downwardly thereon, thereby removing the leaves. These sides of the frame bear a fixed and permanent relationship to each other. The frame being fixed and static thus differs from prior frames formed in distinct sections which must come together to form an enclosing ring or frame and later separate when leaving the stalk.

Yet another object of the invention is to provide an endless belt-like unit to convey the defoliating means down the stalk.

Still another object of the invention is to provide a simple means for conveying the leaves removed from the stalk to storage in radial alignment or nonaligned form.

A particularly novel feature of the present invention resides in an endless defoliator belt with grid-like openings and as the belt starts its downwardly inclined working course, the upper end of each low topped plant enters an opening whose sides, surrounding the plant, move downwardly, removing the leaves with what can be best described as a pushing action, which is remarkable for its precision. The leaves, while retaining their initial radial positions, are collected on a horizontal section of a rearwardly moving combined leaf elevation and pick-up conveyor belt formed in two spaced sections with an aisle therebetween through which the stripped stalks pass. This aisle is narrow and the smallest leaves are wider than the aisle so no leaves are dropped and they pass immediately through a nip at the entrance to a rearwardly inclined section where the defoliator belt and the leaf elevator belts start to travel in face-to-face engagement.

The belts can be driven either from the tractor wheels or other power units or by separate wheels to which rotation is imparted by moving contact with the ground. In either event, the rearwardly speed of the defoliating and pick-up belts during the harvesting course, is about the same as that of the forward travel of the tractor, but in the opposite direction. After the leaves are removed from the stalks, a longitudinal or lateral conveyor deposits the leaves in a tractor-mounted storage box.

Another significant storage means consists of a spool with a long flexible web to which the leaves are delivered as the web is wound on the rotating spool. When a spool is filled, it is retained in the rolled-up condition and moved to a processing facility where air passing through the roll cures the tobacco.

In the drawings:

FIG. 7 is a view showing a modified transverse bar with a telescopic shaft at one end;

FIG. 8 is a side elevation of the defoliator unit as it approaches a tobacco plant;

FIG. 9 shows the machine having advanced further and the upper end of the stalk entering an opening in the defoliator belt;

FIG. 10 shows the position of the machine when all of the leaves have been removed from the stalk and the leaves entering the nip between the defoliator belt and the pick-up belt;

FIG. 11 shows the stripped stalk passing to the rear of the defoliator unit;

FIG. 12 shows a means of driving the conveyor belt from separate drive wheels which contact the ground;

FIG. 13 shows a belt formed as a continuous web;

Figure 1:
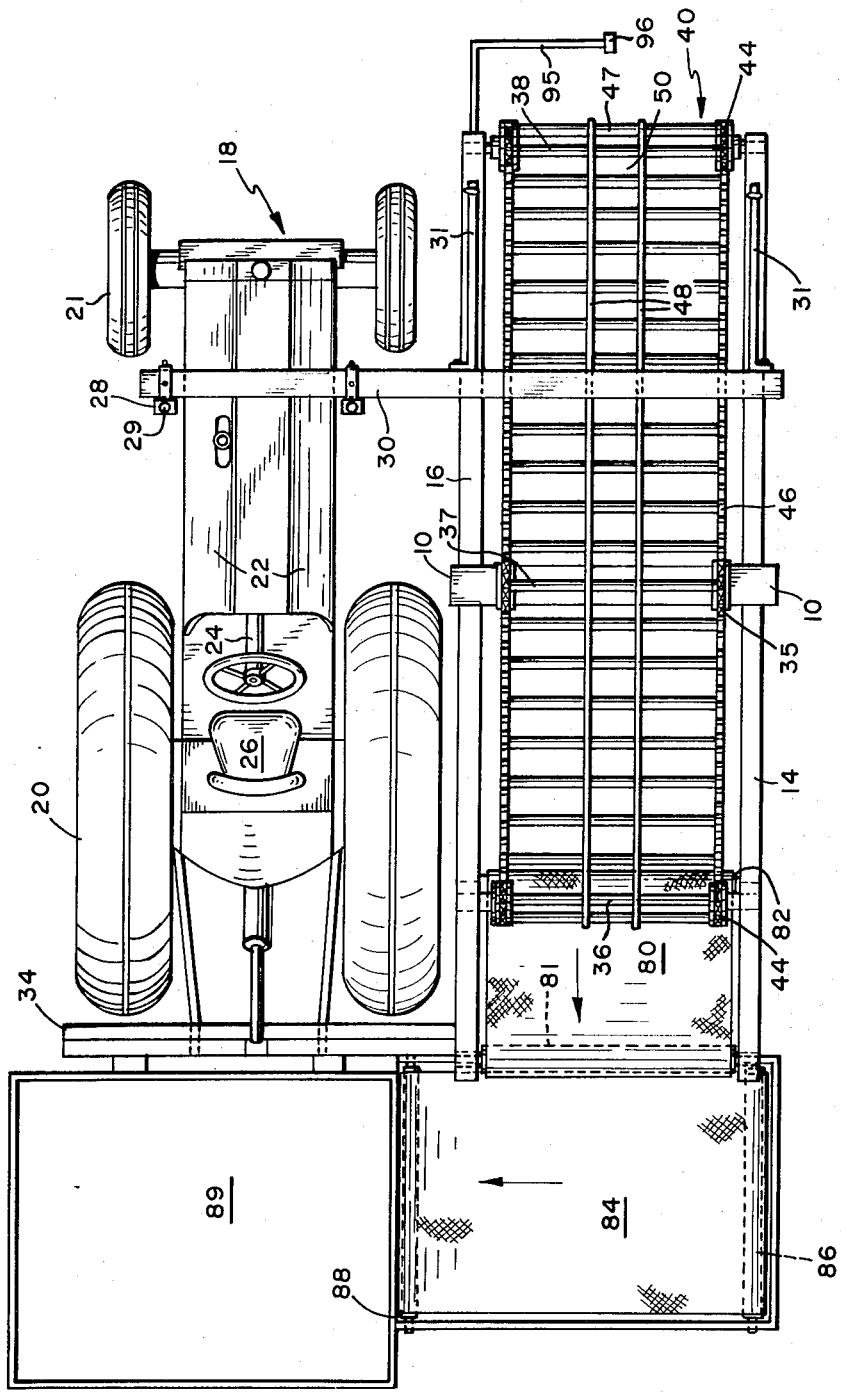
FIG. 1 is a top plan view of a tobacco harvesting apparatus of the present invention.
Figure 2:
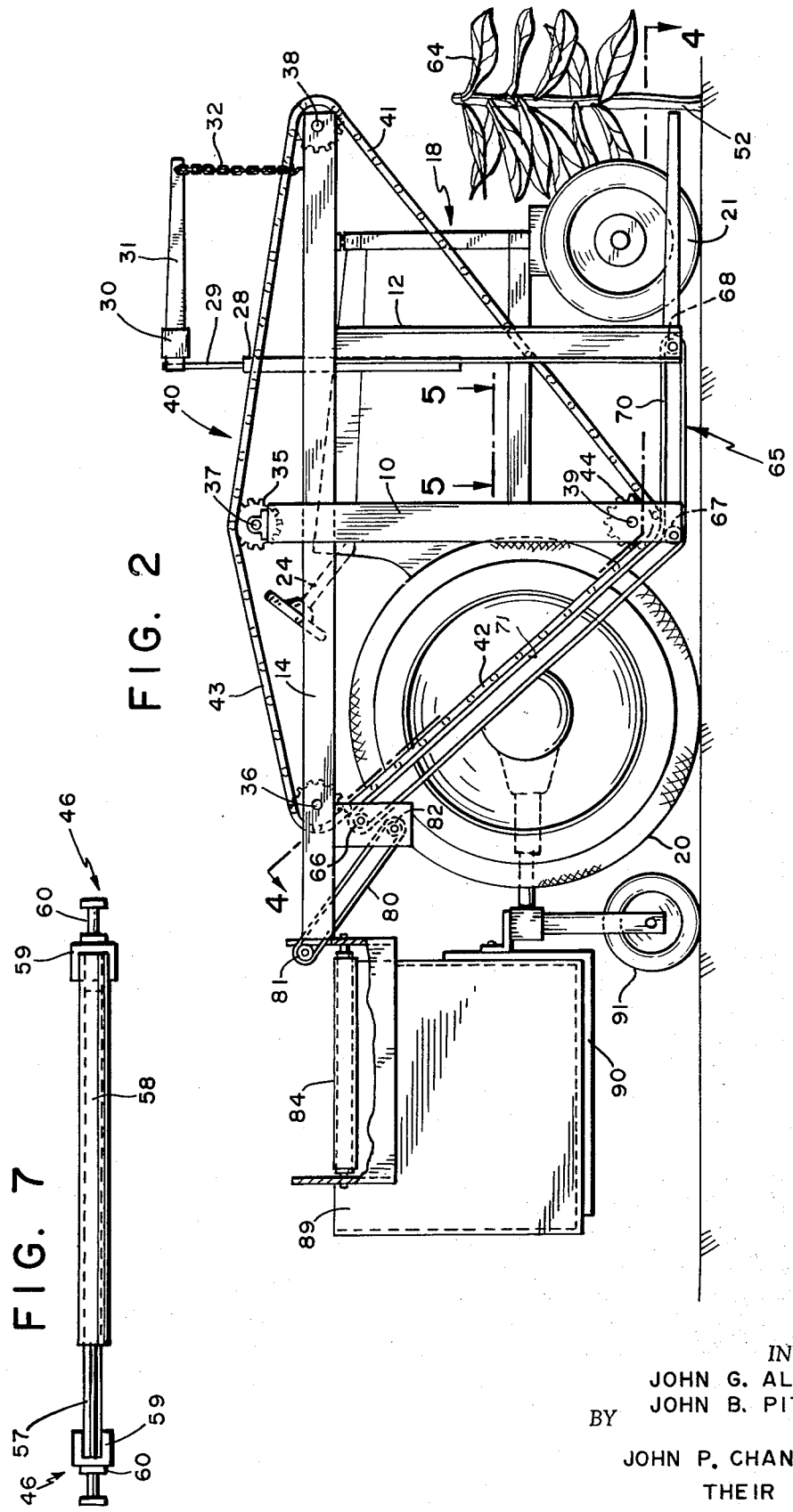
FIG. 2 is a side elevation thereof.
Figure 3:
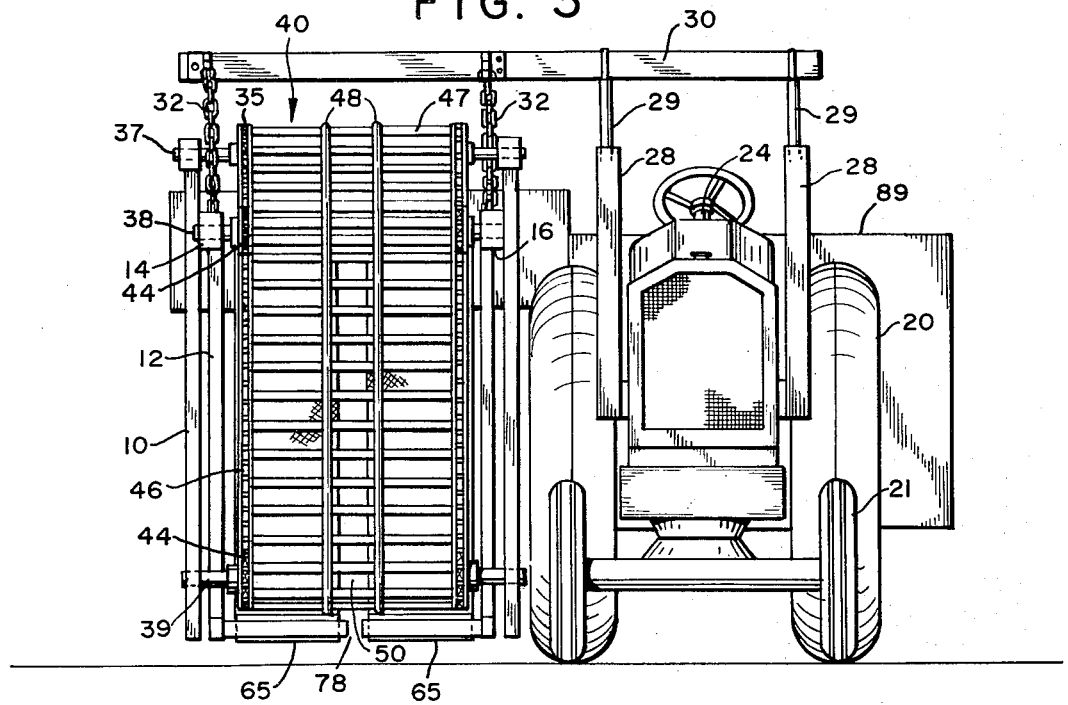
FIG. 3 is a front elevation.
Figure 4:
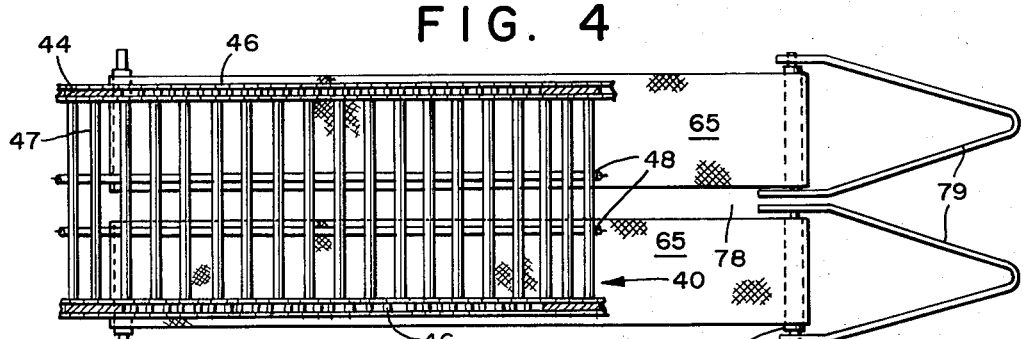
FIG. 4 is a plan view of the defoliation assembly.

FIG. 14 is a section on lines 14—14 of FIG. 13;
FIG. 15 is a section on lines 15—15 of FIG. 13;
FIG. 16 shows a modified storage means;
FIG. 17 is a section on line 17—17 of FIG. 16.

The apparatus of the present invention has a defoliator unit including an endless conveyor-type of belt with openings spaced longitudinally of the belt. The tobacco stalks with the leaves still intact enter these openings each of which forms, in effect, a frame whose sides are in fixed relation to each other. One such frame travels downwardly on each stalk as the belt follows a downward diagonal course, breaking and removing the leaves therefrom and depositing them on a pick-up conveyor.

Roller assemblies arranged in triangular configuration form two working courses of V-shape, the first of which remove the leaves and in the second course the leaves are conveyed upwardly. A horizontal return course at the top connects the two courses. The roller assemblies supporting the belt for travel are mounted in a frame which can be suspended from a tractor on one side thereof and can be moved up and down to vary the harvesting height.

The frame includes spaced rear and front vertical frame members 10 and 12 secured to two horizontal structural beams 14 and 16. The tractor 18 from which the frame is suspended has large rear wheels 20, smaller front wheels 21, longitudinal frame members 22, steering apparatus 24, an area for the driver including a seat 26, etc. A bracket 95 with an index element 96 enables the driver to steer in the center of the row.

The tractor is provided with a front hydraulic lift including transversely spaced vertical hydraulic cylinders 28 containing pistons (not shown) and piston rods 29 secured at their upper ends to a transverse beam 30 which is the principal support for the defoliating unit. This beam has forward extensions 31 with chains 32 depending therefrom and secured at their lower ends to the defoliator frame members 14–16. Another beam 34 at the rear of the tractor supports the rear sections of the unit and this may or may not be vertically adjustable.

The spaced structural frame members 14–16 and the rear vertical frame member 10 forms a journal support for four shafts 36, 37, 38 and 39 on which the endless defoliator belt 40 is mounted for travel.

The lower section of the belt traverses a V-shaped path with a first course 41 extending downwardly and rearwardly and the belt has openings, hereinafter described, to receive the plants and remove the leaves during this diagonal downward travel. During travel up the second course 42, the harvested leaves are conveyed upwardly and the bare plants eventually are freed from the openings. The third course 43 is substantially horizontal and connects the first and second diagonal courses. Sprockets 35 on shaft 37 at the upper ends of vertical frames 10 are vertically adjustable to vary the tension of the belt. If this belt is a continuous web with suitable openings for the stalks during its travel, the shafts may support conventional roller assemblies for belts but in the first form of the invention, the shafts are shown as supporting sprockets 44 at opposite ends which carry a pair of spaced endless chains 46. Transverse bars 47 are supported in spaced relation on the links and resilient bands 48 extend around the bars the full length of the defoliator belt and are alternately secured to the transverse bars by clamps 49. These bands are resilient tubes resembling garden hose and they are spaced apart a distance slightly more than the distance between the bars 47 and form with each adjacent pair of bars an opening 50 through which the upper end of the stalk passes as the first or front course of the defoliator belt commences its downward diagonal travel. The bars 47 and bands 48 defining this opening remove the leaves from the plant by breaking, cutting or shearing action.

Figure 5:
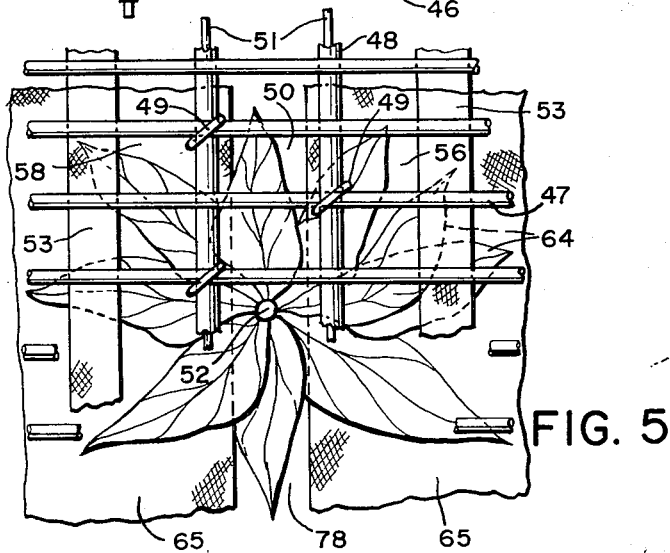
FIG. 5 is a broken plan view showing the cooperation between the two conveyor devices in the area where they are in face-to-face engagement and shows a modification in the defoliator belt.
Figure 6:
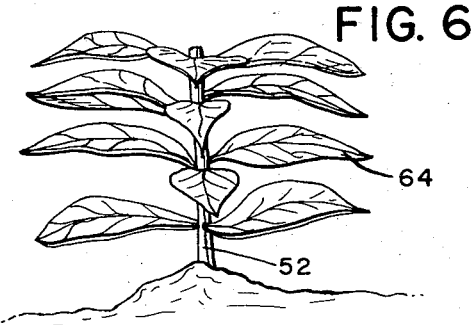
FIG. 6 is a side elevation of the modified tobacco plant.

Sometimes these stalks have considerable strength and cause damage to the resilient bands. To remedy this, a steel cable 51 (FIG. 5) extends the full length of each band.

Most of the stalks, shown at 52, extend straight up and no difficulty is experienced in having the upper end of the stalks pass straight into the defoliater opening. There are, however, occasional stalks which are inclined to one side or the other and two additional bands 53, also shown in FIG. 5, may be secured outside of bands 48. This forms two additional stripping openings 55 and 56 for each adjoining pair of transverse bars 47. The pressures which the stalks exert against the supplementary bands 53 are not as great as they exert against bands 48 so the supplemental bands 53 may be made from canvas.

It should be noted that when a stalk does forcibly strike a band 48, which is secured to the transverse bar 47 by clamps 49, it tends to move the bar to the right or left and this has caused trouble by dislodging the chain from the sprocket. To remedy this, the bar can be modified as shown in FIG. 7. In this case, the bar is of telescopic construction and includes a solid shaft 57 which moves freely in and out of a tubular shaft 58. Shafts 57 and 58 carry brackets 59 at their ends which are secured in any suitable manner to links 60 of chassis 46. In FIG. 7, the solid shaft 57 is shown as secured by bracket 59 to a link on the left hand chain. To achieve a proper balance, the solid shaft 57 on the next telescopic bar is secured to a link on the right hand chain.

The stalk 52 with its leaves 64 differs from the conventional plant in that it has been topped earlier in its growth, at such a height that all the leaves on the stalk can be harvested at one time. The actual quantity of tobacco harvested from an acre is about the same as that obtained from conventional plants which are normally harvested about five times at intervals of about one week.

A pair of spaced leaf conveyor belts 65 are supported on roller assemblies 66, 67 and 68 and the upper courses of these companion belts, with front horizontal sections 70 and rear diagonal sections 71, are deflected by the lower roller assembly on shaft 39 to cause the rear upper diagonal course to travel in substantial face-to-face engagement with second course 42 of the defoliator belt. As the leaves 64 are progressively removed from the plant they are deposited at the rear of the rearwardly moving horizontal course 70 of the conveyor belts 65 at the nip N between the two belt assemblies. The plant passes through the aisle 78 formed between the lower conveyor belts 65 and the leaves travel upwardly between the belts. The front roller assembly 68 is supported by the frame which also supports guide frames 79 to guide the plants into the aisle.

When the leaves depart from the upper end of the pick-up conveyor belt 65, they drop to a third conveyor belt 80 supported between two rollers 81 and 82 and, at the limit of their upward travel, they are deposited on a transverse belt conveyor 84 supported on rollers 86 and 88 which transfers the leaves to a storage box 89, which may be supported on a fork lift 90 on the tractor. A rear wheel is shown at 91.

Any suitable means may be employed for driving the defoliator belt and the pick-up belt, as well as the other conveyor belts. One such means is shown in FIG. 12 wherein the tractor 18 has supplemental drive wheels 92 on a shaft 93 in contact with the ground which drive the conveyors from a chain 94 connected with the wheels, at a speed synchronized with the ground speed.

FIG. 13 is a perspective view of a defoliator belt formed as a continuous web. It consists essentially of a flat endless belt 100 suitable for friction drive and formed with centrally disposed openings 101 of about the same size and shape as the openings 50 in belt 40 of FIG. 1. This belt can be composed of laminations of tightly twisted, woven cotton duck impregnated with rubber compounds. The areas at the ends of the openings 101 may be reinforced by longitudinal metallic cables 102 to reinforce the belt against damage by heavy stalks. These cables are preferably imbedded in the belt and extend clear around the endless belt. If it is desired, the reinforcement may consist of short pins. Instead of the friction drive, the belt may be of the positive drive type mounted on grooved drive rollers and having a grooved surface on its inner face to match the grooves in the drive rollers.

FIG. 16 shows the novel storage belt arrangement wherein the belt is wound on a spool at the end of the machine. As the machine moves over the field removing the tobacco leaves, the leaves are deposited on a moving storage belt. This storage belt 108 is withdrawn from a feed roll 110 at constant speed to receive relatively even distribution of tobacco thereon from belt 65 as best shown in FIGS. 16 and 17.

This is accomplished by a drive roller 112 over which the belt 108 runs to be wound upon a pickup spool 114. The roller 112 is driven by a sprocket 116 through a chain 118 which is synchronized with the belt 65. Driving friction between the drive roller 112 and the belt 108 is accomplished by a roller 120 at each side of the belt pressing the belt against the roller 112 by virtue of an adjustable pressured spring 121. Tobacco is prevented from becoming entangled with the roller 120 by a deflection plate 122.

The spool 114 is rotatably positioned upon two idler rollers 124 on a shaft 123 and two drive rollers 125, mounted upon a common shaft 126 which also carries a pulley 127 for receiving power via a belt 128 from a pulley 129 which is mounted upon the shaft of the drive roller 112. The belt 128 also passes over an idler pulley 130 which keeps the belt taut to provide driving friction between the pulleys 129 and 127. The taut force is provided by a tension spring 131 secured to the end of an arm 132 which carries the idler pulley 130 and pivots at 133. As the belt is wound on the spool, the layer of tobacco leaves 64 is compressed to something less than one half its initial thickness. As the diameter of the spool 114 increases, it tends to tighten the belt 108 which stops the rotation of the spool but the pulley 129 continues to drive the belt 128 thus raising the idler pulley 130 about pivot 133 against spring 133 thereby reducing the friction between the belt 128 and the spool drive pulley 127 allowing the belt to slip while the spool 114 momentarily pauses.

To prevent sagging of the belt a platen 134 can be positioned beneath the belt 108.

In order to prevent undue feeding of the belt 108 from the roll 110, a brake shoe 135 carried on arm 136 which pivots at 137 is pressed against a braking collar 138 by a spring 140 attached to the free end of the arm 136.

What is claimed:

1. A machine for removing leaves from vertically standing plant stalks comprising;

endless defoliating means having a downward inclined front portion, said defoliating means having a plurality of longitudinally spaced-apart stalk-receiving and leaf-removing apertures;

a mobile frame for supporting said defoliating means; and means for moving said defoliating means so that the horizontal velocity of said apertures on said inclined portion is substantially equal and opposite to the velocity of said mobile frame so that as a stalk enters an aperture on the inclined front portion of said defoliating means, the stalk remains substantially upright as the aperture moves downwardly over the stalk to remove its leaves.

2. The machine as recited in claim 1, wherein said endless defoliating means comprises opposed endless chains, roller assemblies for supporting said endless chains, spaced-apart transverse bars connected at their ends to said opposed chains to form a belt around said roller assemblies, and reinforced resilient bands extending completely around said belt and secured to said transverse bars in spaced-apart relationship to form with said bars, said stalk receiving and leaf-removing apertures.

3. The machine as recited in claim 1 additionally comprising means cooperating with said defoliating means for conveying the removed leaves upward to an output position of said defoliating means.

4. The machine as recited in claim 3, wherein said cooperating means comprises a pair of spaced conveyor belts having an aisle therebetween, said belts disposed under the downward inclined front portion of said defoliating means and engaging an upward inclined portion of said defoliating means so as to convey the removed leaves to said output.

5. The machine as recited in claim 1, wherein said endless defoliating means comprises an endless flexible defoliator belt having a plurality of spaced openings therein and at least three roller assemblies pivotably supported on said mobile frame in a substantially triangular arrangement having spaced-apart upper front and rear rollers and at least one lower roller disposed between said front and rear rollers so that said downward inclined front portion is formed between said upper front and said lower rollers and an upward inclined rear portion is formed between said lower roller and said upper rear roller.

6. The machine as recited in claim 5 additionally comprising an idler roller assembly pivotably positioned between said two upper rollers for adjusting the tension in said belt.

7. The machine as recited in claim 1 additionally comprising at least one wheel contacting the ground and coupled to said defoliating means for moving said defoliating means at a predetermined speed with respect to the speed of said mobile frame.

8. The machine as recited in claim 2, wherein said transverse bars are formed of telescopic sections, said bars being secured at their outer ends to opposed links on said chains.

9. The machine as recited in claim 2, wherein said belt comprises a second set of resilient bands secured to said transverse bars and spaced outwardly from said first set of resilient bands.

10. The machine as recited in claim 1 additionally comprising an indexing device secured to said mobile frame to serve as a guide for positioning said mobile frame in alignment with said plant stalks.

11. The machine as recited in claim 1 additionally comprising means for raising and lowering said mobile frame with respect to said plant stalks to a predetermined fixed height.

12. The machine as recited in claim 1, wherein said endless defoliating means comprises a belt formed of laminated nonmetallic material and wherein said stalk receiving and leaf-removing apertures are formed within said belt.

13. The machine as recited in claim 12, wherein said apertures formed within said laminated belt are reinforced by metallic members embedded in said belt.

14. The machine as recited in claim 1 additionally comprising a web, a supply roll positioned at an output of said endless defoliating means for containing said web, a rotating storage spool coupled to one end of said web for winding said web to form convolutions on said spool with the removed leaves between adjacent convolutions, and means for winding said web on the spool at a substantially constant speed with respect to speed of said mobile frame.

15. The machine as recited in claim 14, wherein said means for winding said web on the spool comprises a pair of friction rollers engaging each side of said spool for imparting driving movement thereto.

16. The machine as recited in claim 15 additionally comprising a driven endless belt mounted on at least one side of said web and coupled to said friction rollers in said spool.

17. The machine as recited in claim 14 additionally comprising an adjustable brake coupled to said supply roll for restraining the free unwinding rotation of said supply roll.

18. The machine as recited in claim 10, wherein said indexing device comprises a horizontally disposed bracket affixed to the forward end of said mobile frame and having an index element affixed to the end thereof positioned substantially at the center of said defoliating means for enabling the operator of the machine to align said defoliating means with respect to said plant stalks.

* * * * *